United States Patent
Lee et al.

(10) Patent No.: US 11,271,758 B2
(45) Date of Patent: Mar. 8, 2022

(54) METHOD AND APPARATUS WITH PHYSICALLY UNCLONABLE FUNCTION (PUF) CELL REMAPPING AND PUF CIRCUIT

(71) Applicant: Research & Business Foundation Sungkyunkwan University, Suwon-si (KR)

(72) Inventors: Yoonmyung Lee, Suwon-si (KR); Jongmin Lee, Suwon-si (KR); Donghyeon Lee, Suwon-si (KR); Yongmin Lee, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 335 days.

(21) Appl. No.: 16/272,110

(22) Filed: Feb. 11, 2019

(65) Prior Publication Data

US 2019/0253266 A1    Aug. 15, 2019

(30) Foreign Application Priority Data

Feb. 9, 2018    (KR) .................. 10-2018-0016196

(51) Int. Cl.
*H04L 9/32*         (2006.01)
*H03K 19/17748*     (2020.01)
*G06F 21/71*        (2013.01)

(52) U.S. Cl.
CPC .......... *H04L 9/3278* (2013.01); *G06F 21/71* (2013.01); *H03K 19/17748* (2013.01)

(58) Field of Classification Search
CPC . H04L 9/3278; H03K 19/17748; G06F 21/71; G06F 21/73
See application file for complete search history.

(56) References Cited

U.S. PATENT DOCUMENTS

| | | | |
|---|---|---|---|
| 2014/0266296 A1* | 9/2014 | Wang | H03K 19/17768 326/8 |
| 2017/0017808 A1* | 1/2017 | Kwong | G11C 29/50012 |
| 2018/0102163 A1* | 4/2018 | Lin | G11C 11/418 |
| 2018/0159685 A1* | 6/2018 | Kwak | H04L 9/0866 |

FOREIGN PATENT DOCUMENTS

JP    2017-512337 A    5/2017

OTHER PUBLICATIONS

Lim Sun Il "Enhancing reliability of Physically Unclonable Function (PUF) using counter" *Semiconductor Display Engineering Sungkyunkwan University*, (2017) (48 pages in Korean, 1 page in English).

Korean Office Action dated Feb. 27, 2019 in counterpart Korean Patent Application No. 10-2018-0016196 (5 pages in Korean).

\* cited by examiner

*Primary Examiner* — Ellen Tran
(74) *Attorney, Agent, or Firm* — NSIP Law (57) ABSTRACT

A method for physically unclonable function (PUF) cell-pair remapping includes combining PUF cell-pairs between PUF cells in a first array and PUF cells in a second array, acquiring physical parameters for each of the PUF cell-pairs, selecting PUF cell-pairs based on a comparison of the acquired parameters with a first reference, and remapping the selected PUF cell-pairs.

18 Claims, 8 Drawing Sheets

METHOD AND APPARATUS WITH PHYSICALLY UNCLONABLE FUNCTION (PUF) CELL REMAPPING AND PUF CIRCUIT

CROSS-REFERENCE TO RELATED APPLICATIONS

This application claims the benefit under 35 USC 119(a) of Korean Patent Application No. 10-2018-0016196 filed on Feb. 9, 2018, in the Korean Intellectual Property Office, the entire disclosure of which is incorporated herein by reference for all purposes.

BACKGROUND

1. Field

This application relates to a method and an apparatus with physically unclonable function (PUF) cell remapping and a PUF circuit, and more particularly to a method and an apparatus for remapping PUF cell-pairs based on a time when an element in the PUF cell-pair is turned on and a PUF circuit.

2. Description of the Related Art

Generally, when a plurality of hardware devices is manufactured, an error out of a designer's control occurs due to various factors. For example, even if two chips are manufactured on the same silicon wafer, the same designed electrical path will have an error of a few nanometers or more, and there is a difference in parameters due to a difference in physical characteristics of a transistor (for example, a difference in doping concentration). The difference in physical parameters is uncontrollable and may be used to identify hardware devices due to the unique physical characteristics for each device.

A security method of using a difference in physical parameters of hardware as identification information is referred to as a physically unclonable function (hereinafter, PUF), and researches to identify hardware devices using the PUF or use the PUF for security have been actively conducted.

In order to configure the PUF using the difference in physical parameters, PUF cell-pairs are mapped with respect to cells configuring the PUF and a difference in physical parameters of each PUF cell-pair is compared to determine a unique value for a corresponding PUF cell-pair. In this case, when the difference in physical parameters between the PUF cell-pairs is a threshold value or less, an error may occur in a unique value of the corresponding PUF cell-pair depending on the external environment or situation, which mainly results in the use of a trimming method instead of the PUF cell-pairs.

However, in the case of the trimming method, availability of the wafer is inevitably lowered by the PUF cell-pairs discarded, which causes a problem that the manufacturing cost is increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for physically unclonable function (PUF) cell-pair remapping includes combining PUF cell-pairs between PUF cells in a first array and PUF cells in a second array, acquiring physical parameters for each of the PUF cell-pairs, selecting PUF cell-pairs based on a comparison of the acquired parameters with a first reference, and remapping the selected PUF cell-pairs.

The physical parameter may be delay time information required to turn on a transistor included in the PUF cell based on a leakage current.

The first reference may be a predetermined first threshold time.

The method may further include acquiring unique information of a corresponding PUF cell-pair by comparing the delay time information of the PUF cell of the first array and the delay time information of the PUF cell in the second array with respect to the PUF cell-pairs.

The acquiring of the unique information, when the delay time of the PUF cell of the first array is shorter than the delay time of the PUF cell of the second array, a value of the corresponding PUF cell-pair may be determined as '1', and when the delay time of the PUF cell of the first array is longer than the delay time of the PUF cell of the second array, the value of the corresponding PUF cell-pair may be determined as '0', or vice versa.

The remapping may include remapping the PUF cells of the first array and the PUF cells of the second array by randomly mapping the selected PUF cell-pairs, acquiring physical parameters for the PUF cell-pairs randomly remapped, and remapping PUF cell-pairs that do not satisfy a second reference among the remapped PUF cell-pairs and at least one PUF cell-pair which is not selected as the remapped object based on the physical parameters.

The comparison of the acquired parameters may be based on differences in respective delay times of the acquired parameters being less than the first reference.

The second reference may be a predetermined second threshold time.

In another general aspect, a PUF circuit include a first transistor, a first array including a plurality of PUF cells, a second array including a plurality of PUF cells, and a controller configured to map PUF cell-pairs between the PUF cells in the first array and the PUF cells in the second array, and compare physical parameters between the PUF cells in the mapped PUF cell-pairs to generate unique information for the corresponding PUF cell-pair. The PUF cells include a first switch configured to selectively connect a gate terminal of the first transistor and a drain terminal of the second transistor according to a first selection signal.

The controller may be configured to compare times when the transistor included in the PUF cell of the first array and the transistor included in the PUF cell of the second array are turned on by a leakage current with respect to the PUF cell-pairs to generate unique information for the corresponding PUF cell-pair.

The first reference may be a predetermined first threshold time.

The first transistor may be shared by the PUF cells.

The first transistor may be a PMOS and the second transistor may be an NMOS.

The first switch may include a fifth transistor having a leakage current smaller than a leakage current of the second transistor.

The PUF circuit may further include a comparator configured to compare an output voltage of the PUF cell of the first array and an output voltage of the PUF cell of the second array that constitute the PUF cell-pair.

The comparator may include at least one flip-flop in which the output voltage of the PUF cell of the first array is connected to a signal terminal and the output voltage of the PUF cell of the second array is connected to a clock terminal.

In another general aspect, an apparatus for PUF cell-pair remapping includes a combination unit configured to map PUF cell-pairs between PUF cells in a first array and PUF cells in a second array, a parameter acquisition unit configured to acquire physical parameters for each of the PUF cell-pairs, a controller configured to select PUF cell-pairs based on a comparison of the acquired parameters with a first reference, and a remapping unit configured to remap the selected PUF cell-pairs.

The comparison of the acquired parameters may be based on differences in respective delay times of the acquired parameters being less than the first reference.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF THE PREFERRED EMBODIMENT

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
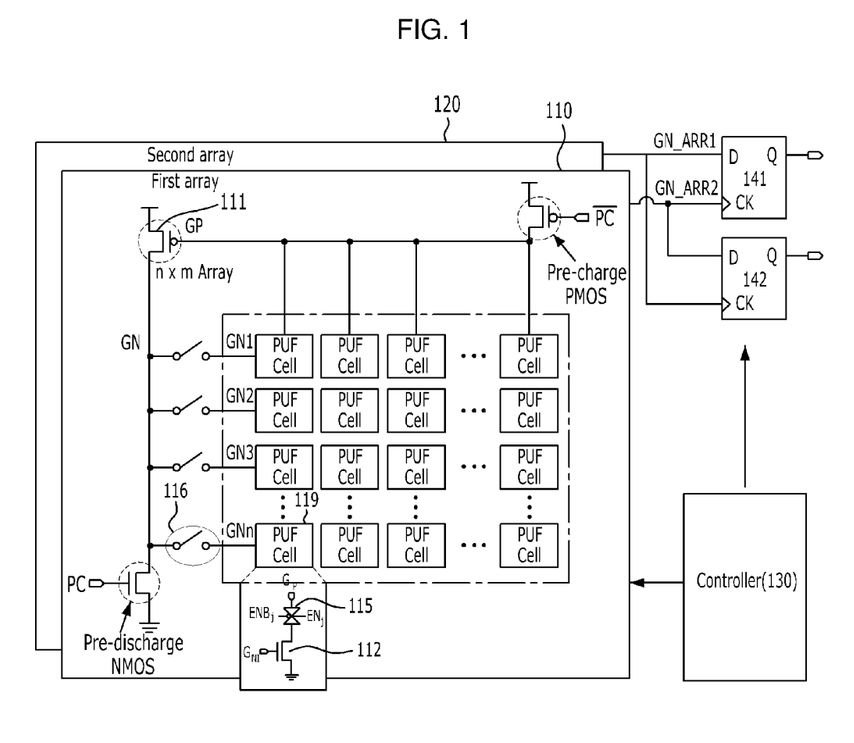
FIG. 1 is a block diagram of a PUF circuit 100 according to an embodiment of this application.

FIG. 1 is a block diagram of a PUF circuit 100 according to an embodiment of this application.

The PUF circuit 100 according to the embodiment of this application includes a first array 110, a second array 120, and a controller 130.

The first array 110 includes a plurality of PUF cells. In this specification, the PUF cell may mean a hardware unit for measuring and comparing physical parameters.

A method of configuring a PUF cell may vary according to the embodiment. Hereinafter, two methods of configuring the PUF cell will be described, but the examples in this application is not limited thereto.

In one example, each PUF cell includes a second transistor 112 and a first switch 115. In the present example, a first transistor 111 and a second switch 116 are disposed outside the PUF cell and shared with one or more PUF cells, but according to other examples, either one or both of the components may be included in one PUF cell.

The first transistor 111 may be implemented as a PMOS, and as described above, a plurality of cells may share one or more first transistors 111, or the first transistor 111 may be included independently in each PUF cell.

The second transistor 112 may be implemented as an NMOS and may be disposed independently for each of the PUF cells.

The first switch 115 connects a gate terminal of the first transistor 111 and a drain terminal of the second transistor 112 according to a first selection signal. The first selection signal may be a control signal for selecting a desired column in the PUF cells. The first switch 115 may include one or more transistors, the leakage current of the transistor included in the first switch 115 may be smaller than the leakage current of the second transistor 112.

The second switch 116 connects a drain terminal of the first transistor 111 and a gate terminal of the second transistor 112 according to a second selection signal. The second selection signal may be a control signal for selecting a desired raw in the PUF cells. The second switch 116 may also include one or more transistors, the leakage current of the transistor included in the second switch 116 may be smaller than the leakage current of the second transistor 112.

Figure 2:
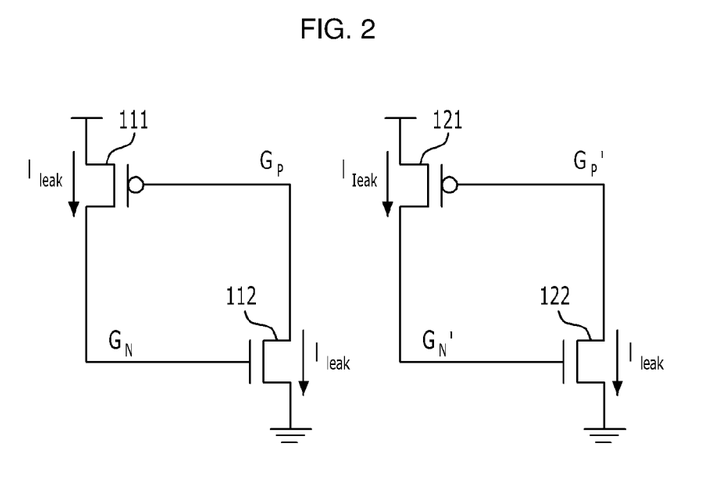
FIG. 2 is a circuit diagram illustrating a structure of a PUF cell according to the embodiment of this application.

If the first selection signal selects a column in which a PUF cell 119 is included and the second selection signal selects a raw in which the PUF cell 119 is included, the PUF cell 119 may constitute the same circuit as FIG. 2.

FIG. 2 is a circuit diagram illustrating a structure of a PUF cell according to the embodiment of this application.

In the circuit illustrated at the left side of FIG. 2, the PUF cell 119 in the first array 110 is selected by the first selection signal and the second selection signal, and in the circuit illustrated at the right side of FIG. 2, a PUF cell 129 in the second array 120 is selected by a third selection signal and a fourth selection signal. For the convenience of description, the PUF cell 119 in the first array 110 is referred to as a first PUF cell, and the PUF cell 129 in the second array 120 is referred to as a second PUF cell. At this time, the first PUF cell 119 and the second PUF cell 129 are configured as a PUF cell-pair for generating corresponding unique information by comparing their physical parameters.

Referring to the left diagram of FIG. 2, the gate terminal of the first transistor 111 and the drain terminal of the second transistor 112 are connected to each other and the drain terminal of the first transistor 111 and the gate terminal of the second transistor 112 are connected to each other.

In addition, a first reference voltage (e.g., VDD) is connected to the source terminal of the first transistor 111, and a second reference voltage (e.g., 0 V) is connected to the source terminal of the second transistor 112. When the first transistor 111 is a PMOS and the second transistor 112 is an NMOS, the first reference voltage is larger than the second reference voltage.

First, the first transistor 111 and the second transistor 112 are both in a turn-off state, which means the Gp node is pre-charged to a first reference voltage and the Gn node is pre-discharged to a second reference voltage. However, as time goes by, a leakage current $I_{leak}$ is getting larger, because the gate voltage of the first transistor 111 and the second transistor 112 are increased (or decreased). Then, when the voltage of the gate terminal of the second transistor 112 is sufficiently large (or small) to turn on the second transistor 112, the leakage current $I_{leak}$ and the voltage are rapidly increased (or decreased). The following Equation 1 shows a relationship between the voltage and the current until the second transistor 112 is turned on.

$$I_{SUB} = I_0 \exp\left(\frac{V_{GS} - V_{TH0} - \eta V_{DS} + \gamma V_{BS}}{nV_T}\right)\left(1 - \exp\left(-\frac{V_{DS}}{V_T}\right)\right) \quad \text{[Equation 1]}$$

Further, the following Equation 2 shows a relationship between the voltage and the current after the second transistor 112 is turned on.

$$I_{SUPER} = \frac{1}{2}\mu C_{OX}\frac{W}{L}(V_{GS} - V_{TH})^2(1 + \lambda V_{DS}) \quad \text{[Equation 2]}$$

$$\text{or } \mu C_{OX}\frac{W}{L}\left((V_{GS} - V_{TH})V_{DS} - \frac{V_{DS}^2}{2}\right)$$

Next, referring to the right diagram of FIG. 2, the gate terminal of the first transistor 121 and the drain terminal of the second transistor 122 are connected to each other and the drain terminal of the first transistor 121 and the gate terminal of the second transistor 122 are connected to each other.

Similarly to the first PUF cell 119, first, the first transistor 121 and the second transistor 122 are all in a turn-off state, but a leakage current $I_{leak}$ and a voltage flowing in the first transistor 121 and the second transistor 122 are increased over time. Then, when the voltage of a gate terminal 241 of the second transistor 122 turns on the second transistor 122, a leakage current $I_{leak}$ and voltage are changed to a turn-on current and voltage, the turn-on current and voltage are rapidly increased (or decreased).

At this time, by a processing error and the like that inevitably occur in the manufacturing process of the PUF cells 119 and 120, the time when the second transistor 112 of the PUF cell 119 is turned on and the time when the second transistor 122 of the PUF cell 129 is turned on are different from each other, and unique information indicated by the corresponding PUF cell-pair 119 and 129 may be obtained by using a difference or out of sync turn-on time. In the present specification, the time when the second transistor in the PUF cell is turned on is referred to as a delay time.

Next, another example for implementing the PUF cell in the PUF circuit 100 according to the embodiment of this application will be described.

In FIG. 2, when the PUF cell is not selected, the first switch 115 and the second switch 116 are present in an open state and leakage currents of the first switch 115 and the second switch 116 are relatively very small so that the size of the leakage current of the second transistor 112 can be ignored. However, in a PUF circuit that includes a plurality of PUF cells, the size of the leakage current that is generated in unselected PUF cells may be large enough that it cannot be ignored. In order to prevent the problem, in the unselected PUF cells, an additional circuit may be constituted so that the leakage current does not flow in the second transistor 112.

Figure 3A:
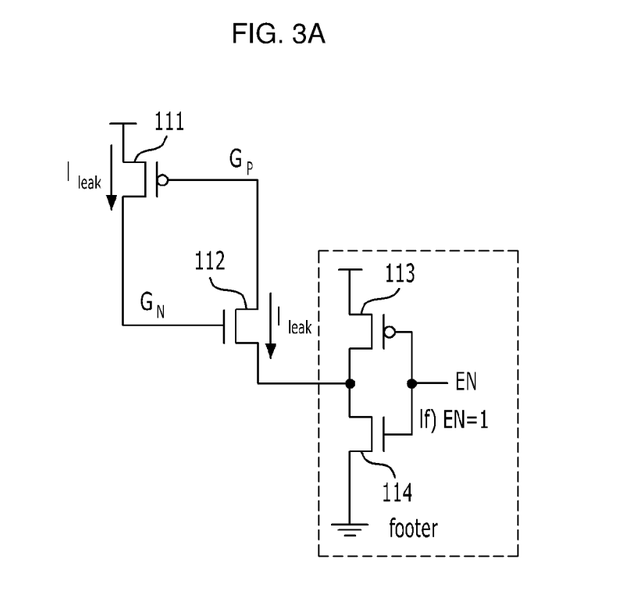
FIG. 3A and FIG. 3B are circuits for a PUF cell that minimizes leakage current in unselected PUF cells according to the embodiment of this application.
Figure 3B:
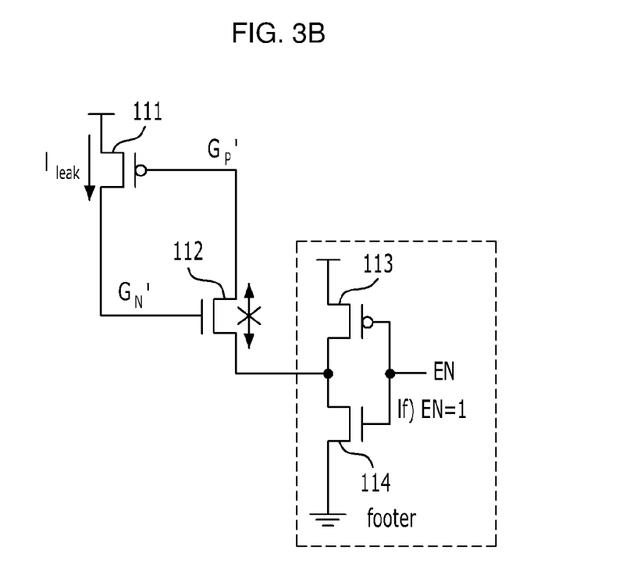

FIG. 3A and FIG. 3B are circuits for a PUF cell that minimizes a leakage current in unselected PUF cells according to the embodiment of this application.

In FIG. 3A and FIG. 3B, each PUF cell includes a second transistor 112, a third transistor 113, a fourth transistor 114, and a first switch 115. Similarly to the first embodiment of the PUF cell, the first transistor 111 and the second switch 116 are disposed outside the PUF cell to be shared in one or more PUF cells.

The third transistor 113 may be implemented as a PMOS, and the fourth transistor 114 may be implemented as an NMOS.

A drain terminal of the third transistor 113 may be connected to a source terminal of the second transistor 112 and a drain terminal of the fourth transistor 114.

In addition, a gate terminal of the third transistor 113 and a gate terminal of the fourth transistor 114 are connected to each other, a source terminal of the third transistor 113 is connected to a first reference voltage (e.g., VDD), and a source terminal of the fourth transistor 114 is connected to a second reference voltage (e.g., 0 V).

When the PUF cells 119 and 129 are selected by the first selection signal and the second selection signal, as illustrated in FIG. 3A, the fourth transistor 114 is turned on and the voltage of a source terminal 323 of the second transistor 112 is set to the second reference voltage.

However, when the PUF cells 119 and 129 are not selected by the first selection signal and the second selection signal, as illustrated in FIG. 3B, the third transistor 113 is turned on and the voltage of the source terminal 323 of the second transistor 112 is set to the first reference voltage.

Accordingly, in comparison with FIG. 2, when the corresponding PUF cell is not selected, a circuit is configured so that the voltage of the source terminal of the second transistor 112 becomes the first reference voltage. Since a potential difference between the source terminal and the drain terminal of the second transistor 112 is reduced, the size of the leakage current flowing in the second transistor 112 is reduced.

Referring back to FIG. 1, the controller 130 maps a PUF cell-pair between PUF cells in the first array 110 and PUF cells in the second array 120 and generates unique information indicated by the corresponding PUF cell-pair by comparing physical parameters between the PUF cells in the mapped PUF cell-pair. In the present specification, the PUF cell-pair means PUF cells for comparing the physical parameters, a single PUF cell in the first array 110 and a single PUF cell in the second array 120 may form a PUF cell-pair. A detailed configuration of the controller 130 will be described below in FIG. 5.

The PUF circuit 100 according to the embodiment of this application may further include a comparator 140 and the comparator 140 may include a plurality of D-flip flops.

In a first flip-flop 141, an output of the first PUF cell may be connected to a data terminal D and an output of the second PUF cell may be connected to a clock terminal CK. At this time, PUF cells connected to an input of the first flip-flop 141 are PUF cells constituting the cell-pair, and the output of the PUF cell may be a current or voltage of a specific terminal (e.g., a gate terminal of the second transistor) in the PUF cell.

In a second flip-flop 142, an output of the second PUF cell may be connected to a data terminal D, and an output of the first PUF cell may be connected to a clock terminal CK.

The first flip-flop 141 and the second flip-flop 142 output input values of the data terminals D at the time when a rising-edge is applied to the clock terminals CK.

For the convenience of description, it is assumed that the output of the PUF cell is the voltage of the gate terminal of the second transistor 112.

First, it is considered that the second transistor included in the first PUF cell is turned on earlier. At the time when the second transistor included in the second PUF cell is turned on, the rising-edge is input to the clock terminal CK of the first flip-flop 141, and at this time, since the second transistor included in the first PUF cell is already turned on, an output value of the first flip-flop 141 will be '0'.

Meanwhile, at the time when the second transistor included in the first PUF cell is turned on, the rising-edge is input to the clock terminal CK of the second flip-flop 142, and at this time, since the second transistor included in the second PUF cell is yet turned off, an output value of the second flip-flop 142 will be '0'.

Next, it is considered that the second transistor included in the second PUF cell is first turned on. In this case, the output value of the first flip-flop 141 will be '0' and the output value of the second flip-flop 142 will be '1'.

In this way, when a key value of the corresponding PUF cell-pair is determined using the output values of the first flip-flop 141 and the second flip-flop 142, the key value is illustrated in the following Table 1.

TABLE 1

| A | B | Key |
|---|---|---|
| 0 | 0 | Not triggered yet |
| 0 | 1 | 0 |
| 1 | 0 | 1 |
| 1 | 1 | Invalid |

Unique information of the PUF cell-pair according to a delay time will be described with reference to FIG. 4.

Figure 4:
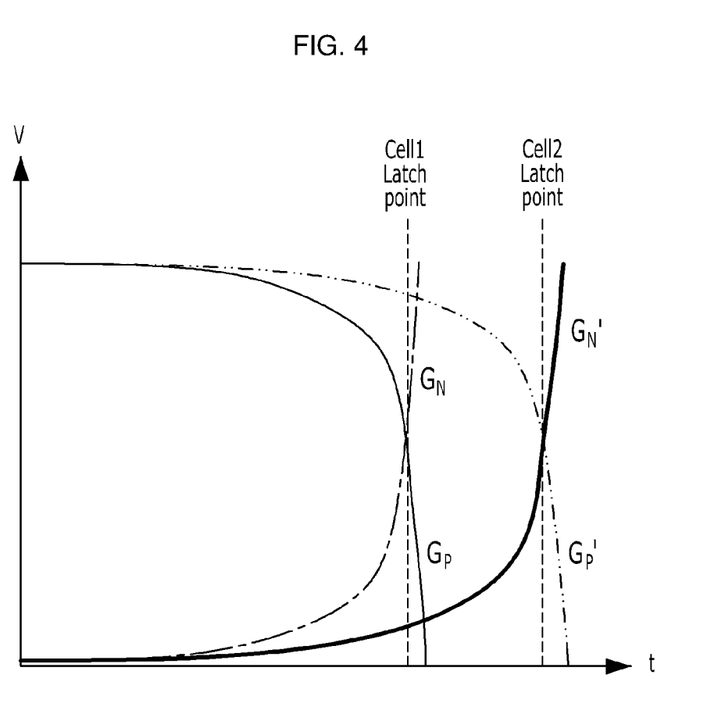
FIG. 4 is a diagram of comparing delay times of a first PUF cell and a second PUF cell according to the embodiment of this application.

FIG. 4 is a diagram of comparing delay times of a first PUF cell and a second PUF cell according to the embodiment of this application.

Referring to FIG. 4, the delay time of the first PUF cell is faster than the delay time of the second PUF cell. Therefore, the unique information of the corresponding PUF cell-pair may be determined as '1'.

Figure 5:
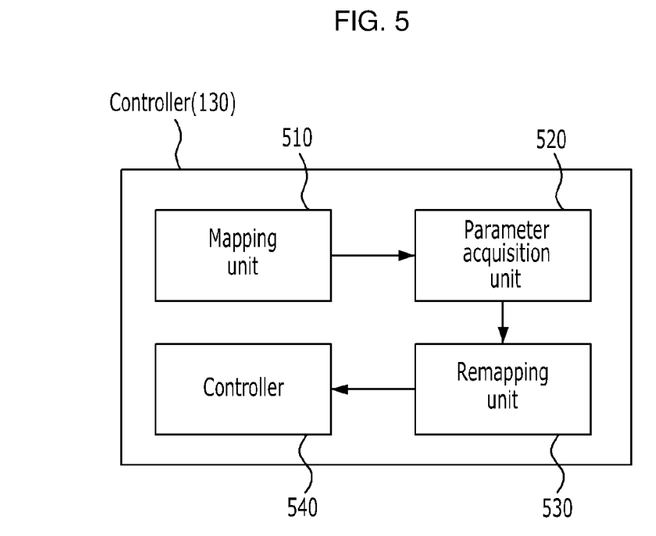
FIG. 5 is a block diagram illustrating a configuration of a controller according to the embodiment of this application.

FIG. 5 is a block diagram illustrating a configuration of a controller 130 according to the embodiment of this application.

The controller 130 according to the embodiment of this application may include a combination unit 510, a parameter acquisition unit 520, a determination unit 530, and a remapping unit 540.

The combination unit 510 maps pairs between the PUF cells in the first array and the PUF cells in the second array. At this time, the combination unit 510 may map cell-pairs by a random method or a pseudo-random method.

The parameter acquisition unit 520 acquires physical parameters for the PUF cell-pairs. That is, the first PUF cell and the second PUF cell constituting the PUF cell-pair acquire physical parameters. For example, the parameter acquisition unit 520 compares times when the PUF cells forming the cell-pair are turned on by the leakage current, and to this end, a counter for measuring a voltage reversal time of the cell-pair may be used.

The determination unit 530 selects a PUF cell-pair to be remapped based on the obtained parameters. The determination unit 530 may select a PUF cell-pair in which a difference in physical parameters is within a predetermined threshold value as the PUF cell-pair to be remapped. At this time, the predetermined threshold value may be at least a threshold value that may cause an error depending on a physical environment, an application, or the like in which the PUF circuit is used.

The remapping unit 540 remaps the selected PUF cell-pairs. Methods of remapping the PUF cell-pairs by the remapping unit 540 may vary.

For example, the remapping unit 540 may perform remapping randomly in the PUF cell-pairs to be remapped. Thereafter, the PUF cell-pairs in which a difference in physical parameters is within a predetermined threshold value among the remapped PUF cell-pairs may be remapped by a random method. At this time, even after the remapping is performed by a predetermined number of times, the PUF cell-pairs in which a difference in the physical parameter is still within the threshold value are excluded from the circuit or may be directly adjusted so that the difference in the parameter is a threshold value or more.

As another example, the remapping unit 540 may remap PUF cell-pairs by targeting the PUF cell-pairs to be remapped and one or more PUF cell-pairs not to be remapped. At this time, the remapping is performed by the random method or the PUF cell-pairs may be matched one to one so that the difference in the parameter is the threshold value or more.

Figure 6A:
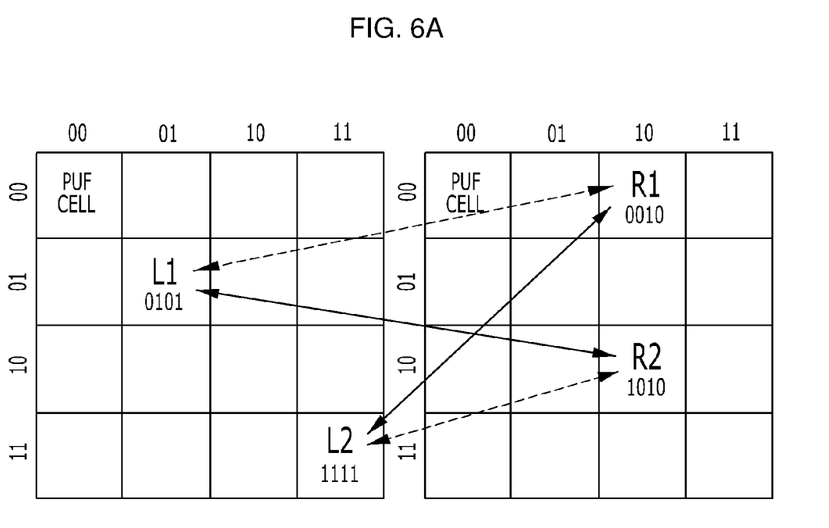
FIG. 6A and FIG. 6B are diagrams illustrating a process of combining cell-pairs in the controller according to the embodiment of this application.
Figure 6B:
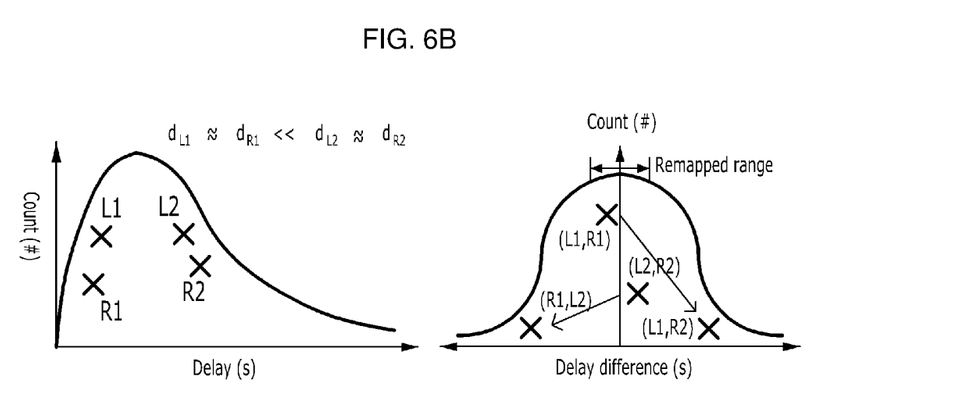

FIG. 6 is a diagram illustrating a process of combining cell-pairs by the controller 130 according to the embodiment of this application.

Referring to FIG. 6A, the first array and the second array include 16 PUF cells, respectively. Hereinafter, a process of combining PUF cell-pairs by the controller 130 in the time order will be described.

First, the combination unit 510 maps cell-pairs by a random method with respect to a PUF cell in the first array and a PUF cell in the second array.

Referring to FIG. 6A, L1 and R1 form a cell-pair and L2 and R2 form a cell-pair. Cell-pair information is formed based on the position of the PUF cell to be (0101-0010) and (1111-1010).

Next, the parameter acquisition unit 520 acquires physical parameters for the PUF cell-pairs.

FIG. 6B is a diagram illustrating a delay time of a PUF cell according to the embodiment of this application and FIG. 6C is a diagram illustrating a delay time difference of a PUF cell-pair.

The determination unit 530 determines a PUF cell-pair to be remapped based on the physical parameters. Referring to FIG. 6B, it can be seen that a difference between the delay time between L1-R1 and the delay time between L2-R2 is negligible. This means that an error may occur when unique information is generated based on the delay time between L1-R1 or L2-R2. Thus, the determination unit 530 determines the PUF cell-pairs of L1-R1 and L2-R2 as a remapping object.

Finally, the remapping unit 540 remaps cell-pairs with respect to the PUF cells to be remapped. At this time, the remapping unit 540 may directly map the cell-pairs or map the cell-pairs by a random method so that a difference in delay time between the cell-pairs is a threshold value or more.

The remapping unit 540 remaps L1-R2 and L2-R1 as new PUF cell-pairs. Cell-pair information is formed based on the position of the PUF cell to be (0101-1010) and (1111-0010).

Figure 7:
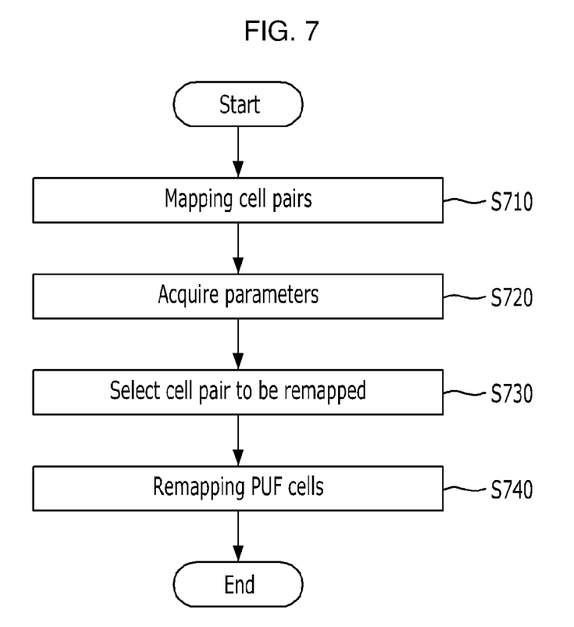
FIG. 7 is a flowchart illustrating a process of combining cell-pairs in the controller according to the embodiment of this application.

FIG. 7 is a flowchart illustrating a process of combining cell-pairs by the controller 130 according to the embodiment of this application.

In step s710, cell-pairs are mapped by a random method between the PUF cells of the first array and the PUF cells of the second array.

In step s720, physical parameters are acquired for each of the PUF cell-pairs. The physical parameters are any parameters required to indicate unique information about the PUF cell-pair. For example, an impedance value, a threshold voltage, or the like may be used, or a delay time, which is a time required when a transistor included in the PUF cell is turned on by a leakage current, may be used as the physical parameter. At this time, the physical parameter values of a pair of PUF cells preferably have a difference of a threshold value or more. Since the physical parameters may be changed depending on an external environment or an application to which a PUF circuit is applied, the difference in the physical parameter values between the pair of PUF cells must be sufficiently large to prevent an error from occurring due to changes in the external environment.

In step s730, a PUF cell-pair that does not satisfy a first criterion is selected based on a difference in the physical parameters of the cell-pair. For example, if the difference in delay time of the cell-pair is within a first threshold time, it may be determined that the corresponding PUF cell-pair does not satisfy the first criterion.

In step s740, the PUF cell-pairs selected in step s730 are remapped. Methods for remapping cell-pairs that do not meet the first criterion may vary. The process of remapping the cell-pairs will be described below in FIG. 8.

When the PUF cell-pairs are mapped, physical parameters are compared for each of the PUF cell-pairs to acquire unique information corresponding to the corresponding PUF cell-pair. For example, in one PUF cell-pair, when the delay time of the PUF cell of the first array is shorter than the delay time of the PUF cell of the second array (that is, when the transistor included in the PUF cell of the first array is turned on earlier than the second PUF cell), the unique information of the corresponding cell-pair is determined as '1', and when the delay time of the PUF cell of the first array is longer than the delay time of the PUF cell of the second array, the unique information of the corresponding cell-pair is determined as '0'.

Thereafter, in an external device to perform authentication of a device equipped with a PUF circuit using the PUF circuit, when unique information of a specific PUF cell-pair is requested, the PUF circuit 100 transmits the unique information of the specific PUF cell-pair to the external device, and the external device may authenticate the corresponding device by searching the received unique information of the cell-pair in a database.

Figure 8:
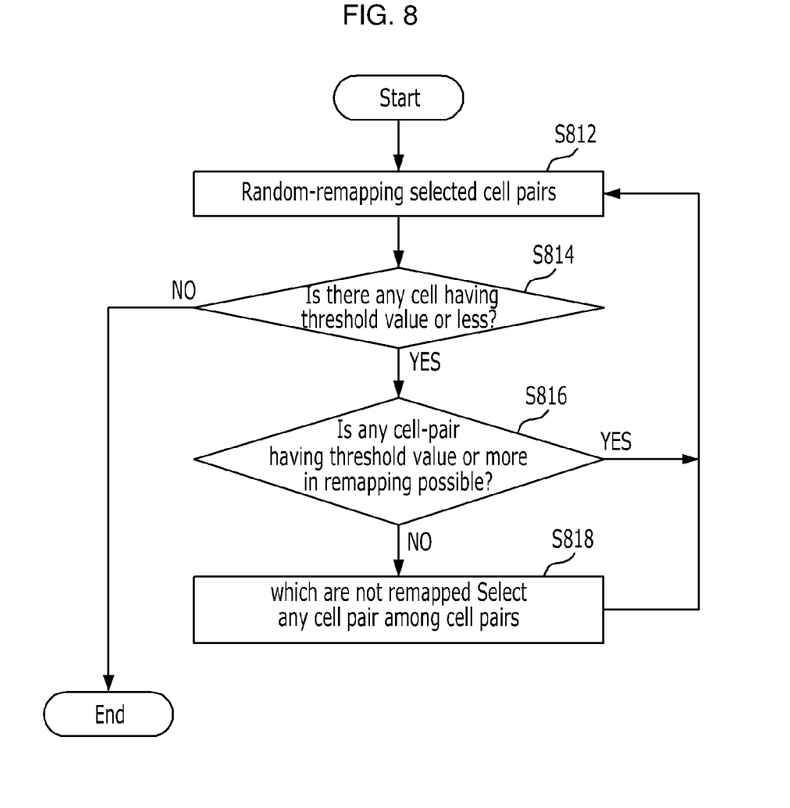
FIG. 8 is a flowchart illustrating a process of remapping PUF cell-pairs according to an embodiment of this application.

FIG. 8 is a flowchart illustrating a process of remapping PUF cell-pairs in step s740 according to an embodiment of this application.

In step s812, PUF cell-pairs to be remapped are remapped by a pseudo-random method.

In step s814, it is determined whether there is any PUF cell-pair that does not satisfy a predetermined criterion among the remapped PUF cell-pairs. When there is a PUF cell-pair that does not satisfy the predetermined criterion, step s816 is performed, and when there is no PUF cell-pair that does not satisfy the predetermined criterion, the combination of the PUF cell-pairs is completed. The criterion used when selecting the object to be remapped in step s730 described above, and the predetermined criterion used in step s814 may be the same as or different from each other.

In step s816, it is determined whether the PUF cell-pairs that do not satisfy the predetermined criterion are remapped to satisfy the predetermined criterion. When it is determined that all the PUF cell-pairs may satisfy the predetermined criterion only by remapping the PUF cell-pairs that do not satisfy the predetermined criterion, step s812 is performed again. However, when it is determined that all of the PUF cell-pairs do not satisfy the predetermined criterion only by remapping the PUF cell-pairs that do not satisfy the predetermined criterion, step s818 is performed, and after adding at least one of the PUF cell-pairs which are not selected as the remapping object in step s730, step s812 is performed again. According to the embodiment, when performing step s818, 1:1 remapping on PUF cell-pairs that do not satisfy a predetermined condition is performed. That is, after comparing a predetermined condition with parameter values of PUF cell-pairs that do not satisfy the predetermined condition, another PUF cell-pair having a desired parameter value is selected, and then, the cell-pair is directly or randomly changed within the corresponding range.

Advantages and/or features of this application, and a method for achieving the advantages and/or features will become obvious with reference to embodiments to be described below in detail together with the accompanying drawings. However, this application is not limited to the embodiments set forth below and will be embodied in various different forms. The present embodiments are just for rendering the disclosure of this application complete and are set forth to provide a complete understanding of the scope of the invention to a person with ordinary skill in the technical field to which this application pertains, and this application will only be defined by the scope of the claims. Like reference numerals refer to like elements throughout the specification.

The controller 130, combination unit 510, parameter acquisition unit 520, a determination unit 530, and a remapping unit 540 in FIG. 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers

What is claimed is:

1. A method for physically unclonable function (PUF) cell-pair remapping, the method comprising:
    mapping PUF cell-pairs between PUF cells in a first array and PUF cells in a second array;
    acquiring physical parameters for each of the PUF cell-pairs;
    selecting one or more PUF cell-pairs that do not satisfy a first criterion based on a difference in a physical parameter value of each PUF cell-pair being within a first reference; and
    remapping the selected one or more PUF cell-pairs that do not satisfy the first criterion,
    wherein the remapping comprises:
        remapping the PUF cells of the first array and the PUF cells of the second array by randomly mapping the selected one or more PUF cell-pairs;
        acquiring the physical parameters for the selected one or more PUF cell-pairs randomly remapped; and
        remapping PUF cell-pairs that satisfy a second reference among the selected one or more PUF cell-pairs and one or more PUF cell-pairs which are selected as a remapped object based on the physical parameters.

2. The method for PUF cell-pair remapping of claim 1, wherein the physical parameter value is a delay time which is a time required to turn on a transistor included in a PUF cell based on a leakage current.

3. The method for PUF cell-pair remapping of claim 2, wherein the first reference is a predetermined first threshold time.

4. The method for PUF cell-pair remapping of claim 2, further comprising:
    acquiring unique information of a corresponding PUF cell-pair by comparing the delay time of the PUF cell of the first array and the delay time of the PUF cell in the second array with respect to the PUF cell-pairs.

5. The method for PUF cell-pair remapping of claim 4, wherein in the acquiring of the unique information, when the delay time of the PUF cell of the first array is shorter than the delay time of the PUF cell of the second array, a value of the corresponding PUF cell-pair is determined as '1', and when the delay time of the PUF cell of the first array is longer than the delay time of the PUF cell of the second array, the value of the corresponding PUF cell-pair is determined as '0', or vice versa.

6. The method for PUF cell-pair remapping of claim 1, wherein the selecting of the one or more PUF cell-pairs is based on differences in respective delay times of the acquired physical parameters being less than a predetermined first threshold time.

7. The method for PUF cell-pair remapping of claim 1, wherein the second reference is a predetermined second threshold time.

8. The method for PUF cell-pair remapping of claim 1, wherein the selected one or more PUF cell-pairs are based on the PUF cell-pairs that satisfy the first reference.

9. A physically unclonable function (PUF) circuit, comprising:
    a first transistor;
    a first array including a plurality of PUF cells;
    a second array including a plurality of PUF cells; and
    a controller configured to map PUF cell-pairs between the PUF cells in the first array and the PUF cells in the second array, and compare physical parameters between the PUF cells in the PUF cell-pairs to generate unique information for one or more PUF cell-pairs based on a result of the comparison,
    wherein the PUF cells respectively comprise a first switch configured to selectively connect a gate terminal of the first transistor and a drain terminal of a second transistor according to a first selection signal,
    wherein the PUF cells respectively comprise a second switch configured to selectively connect a gate terminal of the second transistor and a drain terminal of the first transistor according to a second selection signal, and
    wherein the controller is configured to:
        remap the PUF cells of the first array and the PUF cells of the second array by randomly mapping the selected one or more PUF cell-pairs;
        acquire the physical parameters for the selected one or more PUF cell-pairs randomly remapped; and
        remap PUF cell-pairs that satisfy a second reference among the selected one or more PUF cell-pairs and one or more PUF cell-pairs which are selected as a remapped object based on the physical parameters.

10. The PUF circuit of claim 9, wherein the controller is configured to compare delay times when a transistor included in the PUF cells of the first array and a transistor included in the PUF cells of the second array are turned on by a leakage current with respect to the PUF cell-pairs to generate unique information for the one or more PUF cell-pairs.

11. The PUF circuit of claim 10, wherein the controller is configured to select one or more PUF cell-pairs based on a difference in a physical parameter value of each PUF cell-pair being within a first reference, and
    wherein the first reference is a predetermined first threshold time.

12. The PUF circuit of claim 9, wherein the first transistor is disposed outside each PUF cell and is shared by the PUF cells, and
    wherein the second switch is disposed outside each PUF cell and is shared by one or more PUF cells.

13. The PUF circuit of claim 9, wherein the first transistor is a PMOS and the second transistor is an NMOS.

14. The PUF circuit of claim 13, wherein the first switch comprises at least one transistor having a leakage current smaller than a leakage current of the second transistor.

15. The PUF circuit of claim 9, further comprising:
a comparator configured to compare an output voltage of the PUF cells of the first array and an output voltage of the PUF cells of the second array that constitute the first PUF cell-pairs.

16. The PUF circuit of claim 15, wherein the comparator comprises at least one flip-flop in which the output voltage of the PUF cells of the first array is connected to a signal terminal and the output voltage of the PUF cells of the second array is connected to a clock terminal.

17. An apparatus for physically unclonable function (PUF) cell-pair remapping, comprising:
a mapping unit configured to map PUF cell-pairs between PUF cells in a first array and PUF cells in a second array;
a parameter acquisition unit configured to acquire physical parameters for each of the PUF cell-pairs;
a controller configured to select one or more PUF cell-pairs that do not satisfy a first criterion based on a difference in a physical parameter value of each PUF cell-pair being within a first reference; and
a remapping unit configured to remap the selected one or more PUF cell-pairs that do not meet the first criterion,
wherein the remapping unit is configured to:
remap the PUF cells of the first array and the PUF cells of the second array by randomly mapping the selected one or more PUF cell-pairs;
acquire the physical parameters for the selected one or more PUF cell-pairs randomly remapped; and
remap PUF cell-pairs that satisfy a second reference among the selected one or more PUF cell-pairs and one or more PUF cell-pairs which are selected as a remapped object based on the physical parameters.

18. The apparatus for PUF cell-pair remapping of claim 17, wherein the selecting of the one or more PUF cell-pairs by the controller is based on differences in respective delay times of the acquired physical parameters being less than a predetermined first threshold time.

* * * * *